(12) United States Patent
Kawaguchi et al.

(10) Patent No.: US 11,853,992 B2
(45) Date of Patent: Dec. 26, 2023

(54) SETTLEMENT DEVICE

(71) Applicant: TOSHIBA TEC KABUSHIKI KAISHA, Tokyo (JP)

(72) Inventors: Yuki Kawaguchi, Tagata Shizuoka (JP); Hidehiro Naito, Mishima Shizuoka (JP); Shinsuke Yajima, Mishima Shizuoka (JP); Daisuke Hattori, Sunto Shizuoka (JP); Masaki Ito, Numazu Shizuoka (JP); Takahiro Saitou, Izunokuni Shizuoka (JP); Kota Suzuki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 405 days.

(21) Appl. No.: 17/224,310

(22) Filed: Apr. 7, 2021

(65) Prior Publication Data

US 2022/0076226 A1 Mar. 10, 2022

(30) Foreign Application Priority Data

Sep. 4, 2020 (JP) .................................. 2020-149143

(51) Int. Cl.
*G06Q 20/20* (2012.01)
*A47F 9/04* (2006.01)
(Continued)

(52) U.S. Cl.
CPC .......... *G06Q 20/208* (2013.01); *A47F 9/046* (2013.01); *B65B 67/1222* (2013.01);
(Continued)

(58) Field of Classification Search
CPC ...... G06Q 20/208; G06Q 20/18; A47F 9/046; A47F 2009/041; B65B 67/1222;
(Continued)

(56) References Cited

U.S. PATENT DOCUMENTS 6,032,128 A * 2/2000 Morrison ................ A47F 9/048
235/462.31
6,155,486 A * 12/2000 Lutz ........................ A47F 9/048
235/383
(Continued)

FOREIGN PATENT DOCUMENTS

JP 2014-89774 5/2014

OTHER PUBLICATIONS

Bobbit, Russell, et al. "Visual item verification for fraud prevention in retail self-checkout." 2011 IEEE Workshop on Applications of Computer Vision (WACV). IEEE, 2011. (Year: 2011).*
(Continued)

*Primary Examiner* — Nathan A Mitchell
(74) *Attorney, Agent, or Firm* — AMIN, TUROCY & WATSON, LLP

(57) ABSTRACT

A settlement device includes a packing unit located near a reading unit to pack a commodity, a symbol of which is read by a reading unit, a measuring unit to measure the packed commodity, a light emitting unit, determining means for determining, using data of weight measured, whether the commodity, the symbol of which is read, is packed, and light-emission controller for, if determining that the commodity, the symbol of which is read, is packed, causing the light emitting unit to emit light in a first form and, if determining that the commodity, the symbol of which is read, is not packed, causing the light emitting unit to emit light in a second form.

20 Claims, 5 Drawing Sheets

(51) Int. Cl.
    *B65B 67/12*     (2006.01)
    *G01G 19/414*     (2006.01)
    *G05B 15/02*     (2006.01)
    *G06K 7/14*     (2006.01)
    *G06Q 20/18*     (2012.01)
    *G06K 7/10*     (2006.01)

(52) U.S. Cl.
    CPC ........... *G01G 19/414* (2013.01); *G05B 15/02* (2013.01); *G06K 7/1413* (2013.01); *G06K 7/1417* (2013.01); *G06Q 20/18* (2013.01); A47F 2009/041 (2013.01); G06K 2007/10504 (2013.01)

(58) Field of Classification Search
    CPC .... G01G 19/414; G05B 15/02; G06K 7/1413; G06K 7/1417; G06K 2007/10504; G07G 1/0072; G07G 1/0054; G07G 1/01
    See application file for complete search history.

(56) References Cited

U.S. PATENT DOCUMENTS

| | | | | |
|---|---|---|---|---|
| 6,363,355 | B1 * | 3/2002 | Morrison | A47F 9/047 705/16 |
| 6,779,722 | B1 * | 8/2004 | Mason | A47F 9/046 235/383 |
| 6,809,645 | B1 * | 10/2004 | Mason | G08B 13/246 340/572.1 |
| 7,620,568 | B1 * | 11/2009 | Parker-Malchak | G06Q 20/20 340/568.1 |
| 7,909,248 | B1 * | 3/2011 | Goncalves | G07G 1/0063 235/462.14 |
| 2002/0170782 | A1 * | 11/2002 | Millikan | G07G 1/0054 186/61 |
| 2005/0184147 | A1 * | 8/2005 | White | G07G 1/0054 235/383 |
| 2008/0061139 | A1 * | 3/2008 | Roquemore | G01G 19/4144 235/383 |
| 2009/0171801 | A1 | 7/2009 | Ryo | |
| 2011/0320296 | A1 * | 12/2011 | Edwards | G06Q 20/208 235/382 |
| 2012/0055982 | A1 * | 3/2012 | Edwards | G01G 19/4144 177/1 |
| 2014/0263631 | A1 * | 9/2014 | Muniz | G01G 19/4144 235/383 |
| 2017/0355531 | A1 * | 12/2017 | Bacallao | A47F 9/047 |
| 2018/0084227 | A1 * | 3/2018 | Migdal | G08B 13/19682 |
| 2019/0241298 | A1 * | 8/2019 | Brooks | A47F 9/04 |
| 2020/0286058 | A1 * | 9/2020 | Edwards | G06V 20/52 |
| 2022/0122434 | A1 * | 4/2022 | Freedman | G07G 1/0072 |
| 2022/0261877 | A1 * | 8/2022 | Naito | G07G 3/006 |

OTHER PUBLICATIONS

Extended European Search Report for European Patent Application No. 21174073.3 dated Oct. 29, 2021.

\* cited by examiner

SETTLEMENT DEVICE

CROSS-REFERENCE TO RELATED APPLICATION

This application is based upon and claims the benefit of priority from Japanese Patent Application No. 2020-149143, filed on Sep. 4, 2020, the entire contents of which are incorporated herein by reference.

FIELD

Embodiments described herein relate generally to a settlement device.

BACKGROUND

In recent years, in a store such as a supermarket or a convenience store, a self-service checkout apparatus (a self-service register) operated by a customer himself or herself purchasing commodities has been used.

Such a self-service checkout apparatus includes a settlement device with which a customer, who is an operator, performs registration operation and settlement operation (that is, the operator is the customer himself or herself). If the customer performs the registration operation for a commodity in the settlement device, the customer images and reads a symbol such as a barcode attached to the commodity with an imaging unit, which is composed of a camera, included in a reading unit provided in the settlement device. Alternatively, the customer optically reads the symbol with the reading unit. Then, the customer packs the commodity, the symbol of which is read, in a bag. If the commodity, the symbol of which is read by the reading unit, is packed, in the settlement device, a light emitting unit emits light to inform the customer that the commodity is packed. If the commodity, the symbol of which is read by the reading unit, is not packed, the light emitting unit emits light to inform the customer that the commodity is not packed.

However, since the light emitting unit is often provided, for example, near a display unit that displays information concerning the commodity or near the reading unit, the customer has to, while turning his or her eyes to a bag and packing the commodity, turn his or her gaze to a direction in which the light emitting unit is located and check whether the light emitting unit emits light. Therefore, it is hard for the customer to check whether the light emitting unit emits light.

DETAILED DESCRIPTION

An aspect of embodiments is to provide, in order to solve the problem described above, a settlement device with which an operator can easily check light emission of a light emitting unit.

A settlement device according to an embodiment includes: a reading unit configured to read a symbol attached to a commodity; a packing unit located near the reading unit and configured to pack the commodity, the symbol of which is read by the reading unit; a measuring unit configured to measure the packed commodity; a light emitting unit provided in a visual field of a packing operator in the packing unit; determining means for determining, using data of weight measured by the measuring unit, whether the commodity, the symbol of which is read by the reading unit, is packed; and light-emission controlling means for, if the determining means determines that the commodity, the symbol of which is read by the reading unit, is packed, causing the light emitting unit to emit light in a first form and, if the determining means determines that the commodity, the symbol of which is read by the reading unit, is not packed, causing the light emitting unit to emit light in a second form different from the first form.

An embodiment is explained below with reference to the drawings. In the embodiment, a settlement device included in a self-service checkout apparatus with which a customer, who is an operator, performs registration operation and settlement operation for commodities by himself or herself is explained as an example.

Figure 1:
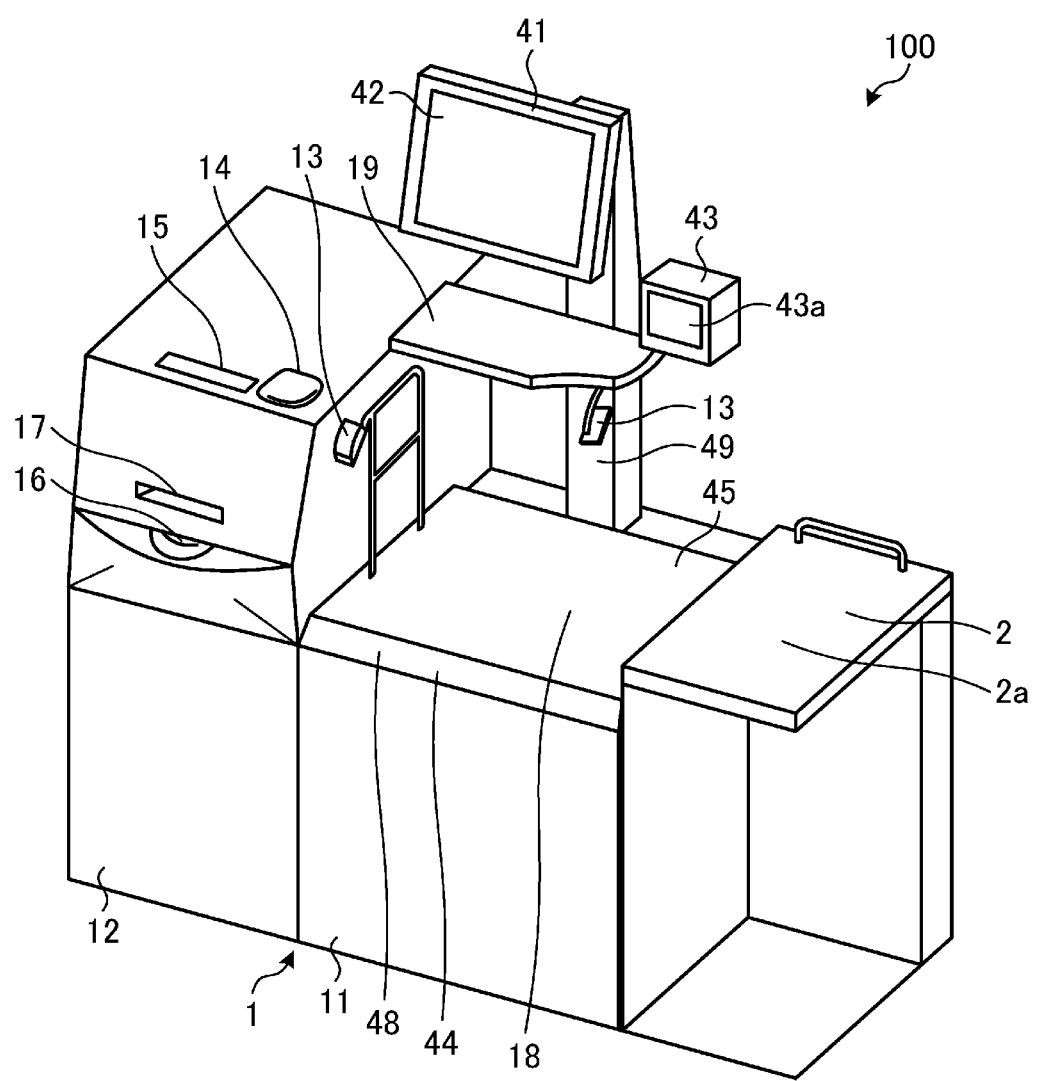
FIG. 1 is a front view illustrating the exterior of a checkout apparatus in an embodiment.

FIG. 1 is a front view illustrating the exterior of a self-service checkout apparatus 100 according to the embodiment. As illustrated in FIG. 1, the self-service checkout apparatus 100 includes a settlement device 1 and a basket placing stand 2. The basket placing stand 2 is a stand including an upper surface 2a on which a commodity to be purchased by a customer or a basket storing the commodity is placed. The settlement device 1 is a device with which the customer himself or herself performs registration operation and settlement operation for the commodity placed on the upper surface 2a of the basket placing stand 2.

The settlement device 1 includes a registration device 11 and a payment device 12. The registration device 11 is a device that reads a symbol attached to a commodity, measures the commodity, the symbol of which is read, and performs registration operation for the commodity. The payment device 12 is a device that performs settlement operation for the commodity for which the registration operation is performed. The registration device 11 is disposed next to the basket placing stand 2. The payment device 12 is disposed next to the registration device 11 on the opposite side of basket placing stand 2.

The registration device 11 includes a display unit 41, an operation unit 42, a reading unit 43, and a light emitting unit 44. The reading unit 43 includes a reading window 43a and reads a symbol such as a barcode or a two-dimensional code attached to a commodity. The reading unit 43 images the symbol to read the symbol. Alternatively, the reading unit 43 deflects a laser beam or the like for scanning the symbol and irradiates the symbol with the laser beam, makes reflected light incident on the symbol, and optically reads the symbol. The display unit 41 is, for example, a liquid crystal display and displays information to the customer, who is an operator. The display unit 41 displays, for example, commodity information (a commodity name, a price, and the like) of the commodity attached with the symbol read by the reading unit 43. The operation unit 42 is, for example, a transparent touch panel provided on a display surface of the display unit 41. The operation unit 42 functions as various keys operated by the customer.

The light emitting unit 44 is, for example, a light source that is configured by one or a plurality of LEDs (Light Emitting Diode) and emits light. The light emitting unit 44 emits a plurality of color lights. The light emitting unit 44 emits, for example, blue light. The light emitting unit 44 emits red light. Light emission is lighting and flashing.

The registration device 11 includes a packing tool 13, a packing unit 18, and a temporary placing stand 19. The packing tool 13 is an instrument for hanging containers that store commodities such as a bag and a shopping bag in which commodities are put. Grips of the bag and the shopping bag are hung on the packing tool 13. In the following explanation and claims, the containers such as the bag or the shopping bag are collectively referred to as bag. The packing unit 18 is a stand including an upper surface for packing commodities in the bag hung on the packing tool 13. The bottom of the bag hung on the packing tool 13 is in contact with the packing unit 18. Therefore, the commodities put in the bag are placed on the packing unit 18 via the bag. That is, the weight of the commodities put in the bag is received by the packing unit 18.

The temporary placing stand 19 is a temporary placing stand for commodities. The temporary placing stand 19 is a stand for, in order to store fragile commodities such as eggs and tofu at the top of the bag, temporarily placing the commodities without immediately putting the commodities in the bag after symbols of the commodities are read by the reading unit 43. The packing tool 13 and the temporary placing stand 19 are attached to the packing unit 18.

The registration device 11 includes a measuring unit 45. The measuring unit 45 is a scale for measuring the weight of commodities. The measuring unit 45 is provided in a lower part of the packing unit 18 and measures the weight of the commodities placed on the packing unit 18 (that is, the commodities stored in the bag hung on the packing tool 13). The measuring unit 45 measures the weight of the commodities placed on the temporary placing stand 19.

The light emitting unit 44 is provided in the packing unit 18 of the registration device 11 and is provided, with a display surface directed upward (or obliquely upward toward the customer side), in the position of a corner section 48 on the near side where the customer stands. The corner section 48 is a position that is not hidden by the bag in a state in which the bag is hung on the packing tool 13 and placed on the packing unit 18. The customer performs, while viewing at least near an opening of the bag hung on the packing tool 13 (that is, checking the position of the opening), a series of operation for putting a commodity, a symbol of which is read by the reading unit 43, in the bag. The corner section 48 is located within the visual field of the customer who performs the operation. Therefore, the customer can check a form of light emitted by the light emitting unit 44 within the same visual field as the visual field at the time when the series of operation for putting the commodity, the symbol of which is read by the reading unit 43, in the bag is performed. That is, the customer can check the form of the light emitted by the light emitting unit 44 without turning a glance on purpose from the visual field at the time when the series of operation for putting the commodity, the symbol of which is read by the reading unit 43, in the bag is performed. Therefore the customer, who is the operator, can easily check the light emission of the light emitting unit 44.

In the registration device 11, the display unit 41, the operation unit 42, and the reading unit 43 are attached to a column 49 erected upward in a rear part of the registration device 11 (on the opposite side of the corner section 48 where the light emitting unit 44 is provided). The display unit 41, the operation unit 42, and the reading unit 43 are not attached to the packing unit 18 or the measuring unit 45.

The reading unit 43 is provided above the packing unit 18. The opening of the bag hung on the packing tool 13 is located near the reading unit 43 and substantially below the reading unit 43.

The payment device 12 is a device that performs settlement operation for the commodity for which the registration operation is performed by the registration device 11. The payment device 12 includes a not-illustrated change machine on the inside. The change machine stores bills and coins on the inside. The payment device 12 includes a coin depositing port 14 and a bill depositing port 15. The coin depositing port 14 is a depositing section into which a price for coin of deposit money to be paid as a price for purchasing the commodity is deposited. The coin deposited from the coin depositing port 14 is stored in the change machine. The bill depositing port 15 is a depositing port into which a price for bill of the deposit money to be paid as the price for purchasing the commodity is deposited. The bill deposited from the bill depositing port 15 is stored in the change machine. The payment device 12 includes a coin change port 16 and a bill change port 17. If there is change to be passed onto the customer for a deposit amount, the coin change port 16 dispenses the change for coin discharged from the change machine. If there is change to be passed onto the customer for the deposit amount, the bill change port 17 dispenses the change for bill discharged from the change machine.

The settlement device 1 executes commodity registration processing for displaying, on the display unit 41, commodity information (a commodity name, a price, and the like) of the commodity to which the symbol imaged by the registration operation is attached and storing the commodity information.

Figure 2:
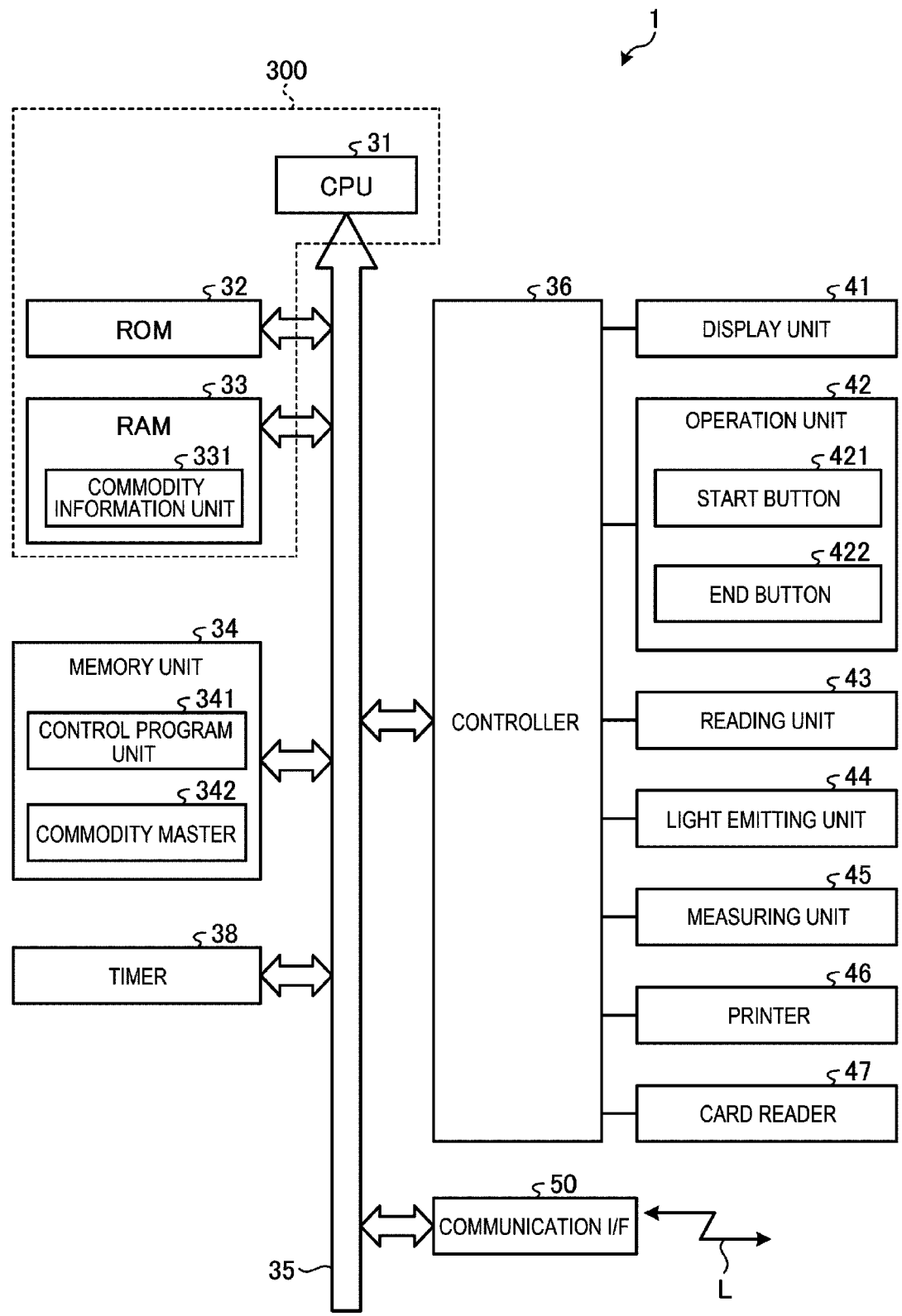
FIG. 2 is a block diagram illustrating a hardware configuration of a settlement device.

The payment device 12 includes a printer 46 and a card reader 47 explained below with reference to FIG. 2. If the settlement operation is performed, the settlement device 1 executes settlement processing for displaying a total amount on the display unit 41 for the commodity subjected to the commodity registration processing, if there is change, dispensing the change from the change machine, and dispensing, from the printer 46, a receipt on which the commodity information and settlement information are printed. The settlement device 1 includes a control unit 300 explained below with reference to FIG. 2.

In such a settlement device 1, the customer puts, in a basket, a commodity to be purchased among commodities displayed in a store and places the basket on the upper surface 2a of the basket placing stand 2. Subsequently, the customer performs an action of taking out the commodity from the placed basket, moving the commodity to the position of the reading window 43a of the reading unit 43, and causing the reading unit 43 to read a symbol attached to the commodity. Subsequently, the customer puts, from an opening of a bag located near the reading unit 43, the commodity in the bag (that is, packs the commodity) in a flow of a series of this operation.

The settlement device 1 reads the symbol attached to the commodity using the reading unit 43. The settlement device 1 measures the weight of the commodity put in the bag using the measuring unit 45. If the commodity, the symbol of which is read, is stored in the bag, the settlement device 1 causes the light emitting unit 44 to light up in blue (emit light in a first form). The settlement device 1 measures the weight of the commodity stored in the bag and, if the commodity, the symbol of which is read, is not stored in the bag, causes the light emitting unit 44 to light up in red (emit light in a second form). Control for light emission of the light emitting unit 44 is explained below with reference to FIG. 5.

A hardware configuration of the settlement device 1 is explained below. FIG. 2 is a block diagram illustrating the hardware configuration of the settlement device 1. As illustrated in FIG. 2, the settlement device 1 includes a CPU (Central Processing Unit) 31, a ROM (Read Only Memory) 32, a RAM (Random Access Memory) 33, and a memory unit 34. The CPU 31 functions as a control entity. The ROM 32 stores various programs. Programs and various data are loaded in the RAM 33. The memory unit 34 stores various programs. The CPU 31, the ROM 32, the RAM 33, and the memory unit 34 are connected to one another via a bus 35. The CPU 31, the ROM 32, and the RAM 33 configure the control unit 300. That is, the CPU 31 operates according to a control program stored in the ROM 32 or the memory unit 34 and loaded in the RAM 33, whereby the control unit 300 executes control processing of the settlement device 1 explained below.

The RAM 33 includes a commodity information unit 331. The commodity information unit 331 stores commodity information of the commodity subjected to the commodity registration processing.

Figure 3:
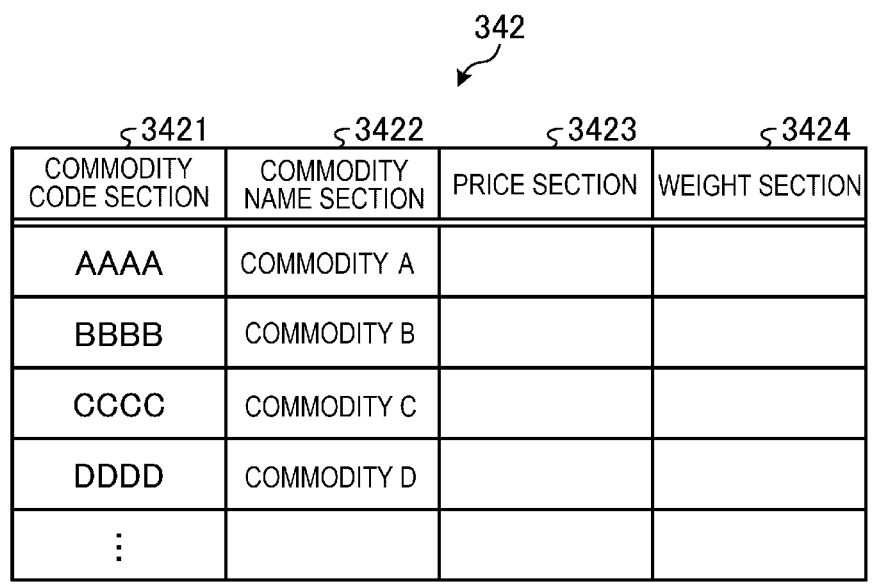
FIG. 3 is a memory map illustrating a commodity master of the settlement device.

The memory unit 34 is configured by a HDD (Hard Disc Drive), a flash memory, or the like and maintains stored content even if a power supply is turned off. The memory unit 34 includes a control program unit 341 and a commodity master 342. The control program unit 341 stores a control program for controlling the settlement device 1. The commodity master 342 stores, for each commodity code for specifying a commodity, commodity information of the commodity and the weight of the commodity. The commodity master 342 is explained below with reference to FIG. 3.

The control unit 300 is connected to the display unit 41, the operation unit 42, the reading unit 43, the light emitting unit 44, the measuring unit 45, the printer 46, and the card reader 47 via the bus 35 and a controller 36. The display unit 41 is configured by, for example, a liquid crystal display device and displays commodity information and the like to the customer who operates the settlement device 1. The operation unit 42 is a touch keyboard including a start button 421 and an end button 422 and provided on the display unit 41. The start button 421 is operated by the customer if the customer starts the registration operation by the settlement device 1. The end button 422 is operated by the customer if the customer ends the registration operation by the settlement device 1 and shifts to the settlement operation. The printer 46 prints the commodity information and settlement information and dispenses a receipt in the settlement processing. The card reader 47 is used if settlement is performed by a credit card, an electronic money, or the like except cash.

The control unit 300 is connected to a communication interface (I/F) 50 via the bus 35. The communication interface 50 is connected to, via a communication line L, a store server (not illustrated) set in the store and performs transmission and reception of information. The control unit 300 is connected to a timer 38 that tracks time via the bus 35.

The commodity master 342 is explained. The commodity master 342 includes a commodity code section 3421, a commodity name section 3422, a price section 3423, and a weight section 3424. The commodity code section 3421 stores a commodity code for specifying a commodity. In an example illustrated in FIG. 3, the commodity code section 3421 stores commodity codes for all commodities sold in the store such as a commodity code "AAAA" for specifying a commodity A, a commodity code "BBBB" for specifying a commodity B, a commodity code "CCCC" for specifying a commodity C, and a commodity code "DDDD" for specifying the commodity D.

The commodity name section 3422 stores, in association with commodities specified by the commodity codes stored in the commodity code section 3421, commodity names of the commodities. The price section 3423 stores, in association with the commodities specified by the commodity codes stored in the commodity code section 3421, prices (unit prices) of the commodities.

The weight section 3424 stores, in association with the commodities specified by the commodity codes stored in the commodity code section 3421, weights of the commodities. The weights stored in the weight section 3424 are basically data indicating the weights of the commodities. However, it is desirable to store the data of the weights stored in the weight section 3424 with a certain degree of tolerance provided to the data considering slight fluctuation in the weights of respective items of the commodities, slight fluctuation in the weights due to a measuring environment, and the like. If weight measured by the measuring unit 45 is within the tolerance of the weight stored in the weight section 3424, the control unit 300 determines that the weight measured by the weighting unit 45 coincides with the weight stored in the weight section 3424.

Figure 4:
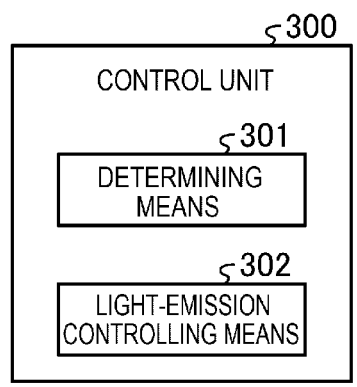
FIG. 4 is a functional block diagram illustrating a functional configuration of the settlement device.

A functional configuration of the settlement device 1 is explained below. FIG. 4 is a functional block diagram illustrating the functional configuration of the settlement device 1. The control unit 300 functions as determining means 301 and light-emission controlling means 302 according to a control program stored in the ROM 32 or the memory unit 34 and loaded in the RAM 33.

The determining means 301 determines, using measurement data measured by the measuring unit 45, whether the commodity, the symbol of which is read by the reading unit 43, is packed. Specifically, the determining means 301 compares, about the commodity, the symbol of which is read by the reading unit 43, the measurement data measured by the measuring unit 45 and the data of the weight of the commodity stored in the weight section 3424 and, if both the weights coincide, determines that the commodity, the symbol of which is read by the reading unit 43, is a commodity put in a bag. If both the weights do not coincide, the determining means 301 determines that the commodity, the symbol of which is read by the reading unit 43, is not the commodity put in the bag.

If the determining means 301 determines that the commodity, the symbol of which is read by the reading unit 43, is packed, the light-emission controlling means 302 causes the light emitting unit 44 to light up in blue (emit light in the first form). If the determining means 301 determines that the commodity, the symbol of which is read by the reading unit 43, is not packed, the light-emission controlling means 302 causes the light emitting unit 44 to light up in red (emit light in the second form different from the first form).

If the commodity is not measured by the measuring unit 45 even if a predetermined time elapses after the reading unit 43 reads the symbol, the light-emission controlling means 302 causes the light emitting unit 44 to flash in red (emit light in a third form different from the first form and the second form).

Figure 5:
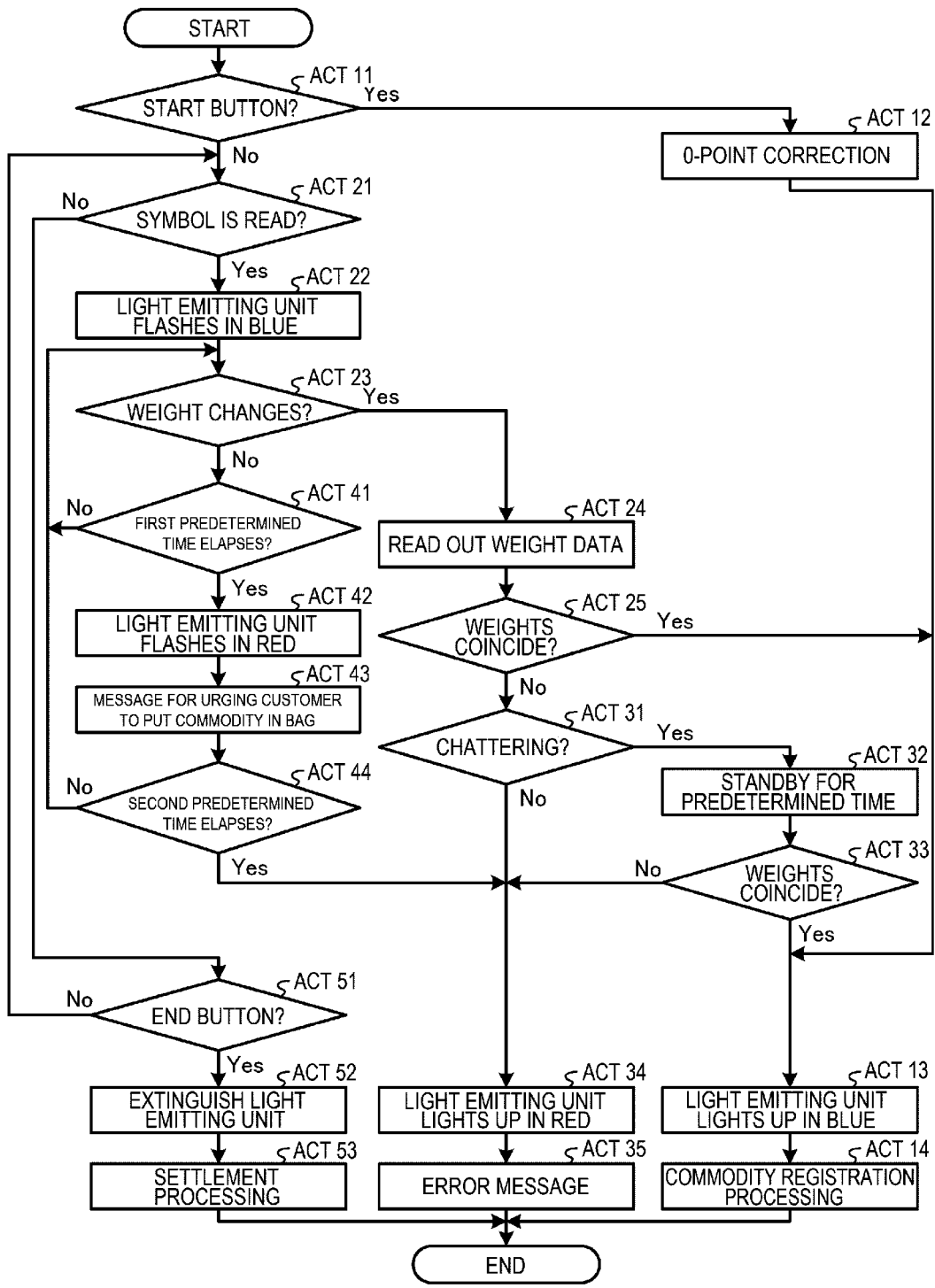
FIG. 5 is a flowchart illustrating control processing of the settlement device.

Control of the settlement device 1 is explained below. FIG. 5 is a flowchart illustrating control processing of the settlement device 1. As illustrated in FIG. 5, the control unit 300 of the settlement device 1 determines whether the start button 421 is operated (ACT 11). If determining that the start button 421 is operated (Yes in ACT 11), the control unit 300 performs 0-point correction for setting measurement data of the measuring unit 45 at this point in time to 0 gram (ACT 12). The light-emission controlling means 302 causes the light emitting unit 44 to light up in blue (emit light in the first form) (ACT 13). The control unit 300 executes commodity registration processing for a commodity, a symbol of which is read in ACT 21, (ACT 14). The control unit 300 ends the processing and returns to ACT 11.

If determining that the start button 421 is not operated (No in ACT 11), the control unit 300 determines whether the reading unit 43 reads a symbol (ACT 21). If determining that the reading unit 43 reads the symbol (Yes in ACT 21), the light-emission controlling means 302 causes the light emitting unit 44 to flash (emit light) in blue (ACT 22). The light-emission controlling means 302 causes the light emitting unit 44 to flash (emit light) in blue as a message for urging, in order to measure the weight of a commodity, the symbol of which is read, the customer to put the commodity in a bag.

Subsequently, the control unit 300 determines whether the measuring unit 45 detects a change in the weight (ACT 23). If the measuring unit 45 detects a change in the weight, the control unit 300 determines that the commodity is put in the bag. If determining that the measuring unit 45 detects a change in the weight (Yes in ACT 23), the control unit 300 reads out data of the weight of the commodity stored in the weight section 3424 based on a commodity code of the commodity acquired based on the symbol read in ACT 21 (ACT 24). The determining means 301 compares the read-out data of the weight and data of the changed weight (that is, data of increased weight) and determines whether both the data of both the weights coincide (ACT 25). If the determining means 301 determines that the data of both the weights coincide (Yes in ACT 25), the light-emission controlling means 302 causes the light emitting unit 44 to light up in blue (emit light in the first form) (ACT 13) and executes the commodity registration processing (ACT 14).

On the other hand, if determining that the read-out weight data and the weight data of the changed weight do not coincide (No in ACT 25), the determining means 301 determines whether the weight measured by the measuring unit 45 cyclically fluctuates (causes chattering) (ACT 31). For example, if the customer powerfully puts the commodity in the bag, in some case, the measuring unit 45 vibrates and measured weight cyclically fluctuates. Accordingly, if the determining means 301 determines that the weight measured by the measuring unit 45 cyclically fluctuates (Yes in ACT 31), the control unit 300 waits for a predetermined time for the chattering to subside (ACT 32). Thereafter, the determining means 301 compares data of weight read out again and the data of the changed weight and determines whether the data of both the weights coincide (ACT 33).

If the determining means 301 determines that the data of both the weights coincide (Yes in ACT 33), the light-emission controlling means 302 causes the light emitting unit 44 to light up in blue (emit light in the first form) (ACT 13). If the determining means 301 determines that the read-out weight data and the weight data of the changed weight do not coincide yet (No in ACT 33), the light-emission controlling means 302 causes the light emitting unit 44 to light up in red (emit light in the second form) (ACT 34). In this case, it is likely that the commodity, the symbol of which is read in ACT 21, and the commodity put in the bag are different commodities. Accordingly, the control unit 300 performs lighting in red indicating a warning (ACT 34). The control unit 300 stops the operation by the customer and displays, on the display unit 41, an error message for, for example, requesting the customer to call a store clerk (ACT 35). The settlement device 1 stops the processing in a state of ACT 35. If the store clerk arrives and releases the error, the control unit 300 ends the processing and returns to ACT 11.

If the determining means 301 determines in ACT 31 that chattering does not occur (No in ACT 31), it is likely that the commodity, the symbol of which is read in ACT 21, and the commodity put in the bag are different commodities. Therefore, the light-emission controlling means 302 causes the light emitting unit 44 to light up in red indicating a warning (ACT 34). The control unit 300 executes the processing in ACT 35.

If determining in ACT 23 that the measuring unit 45 does not detect a change in the weight (No in ACT 23), the control unit 300 determines that the commodity, the symbol of which is read in ACT 21, is not put in a bag yet and stays on standby for a first predetermined time tracked by the timer 38. The control unit 300 determines whether the first predetermined time elapses (ACT 41). Until the first predetermined time elapses (No in ACT 41), the control unit 300 returns to ACT 23 and determines whether the measuring unit 45 detects a change in the weight. If the control unit 300 determines that the first predetermined time elapses (Yes in ACT 41), since the commodity is not put in a bag yet, the light-emission controlling means 302 causes the light emitting unit 44 to flash in red (emit light in the third form) (ACT 42). The flashing in red of the light emitting unit 44 in ACT 42 is a message for strongly urging the customer to put the commodity in a bag (is not a warning). The control unit 300 displays, on the display unit 41, the message for strongly urging the customer to put the commodity in a bag (ACT 43).

Subsequently, the control unit 300 determines whether a second predetermined time elapses (ACT 44). A start of tracking of the second predetermined time is the same timing as a start of tracking of the first predetermined time. The second predetermined time is longer than the first predetermined time. That is, the second predetermined time is a time when a predetermined time further elapses after the first predetermined time elapses. Until the second predetermined time elapses (No in ACT 44), the control unit 300 returns to ACT 23 and determines whether the measuring unit 45 detects a change in the weight. If determining that the second predetermined time elapses (Yes in ACT 44), the control unit 300 determines that the commodity is not put in a bag after the symbol is read in ACT 21. The light-emission controlling means 302 causes the light emitting unit 44 to perform lighting in red indicating a warning (ACT 34). The control unit 300 executes the processing in ACT 35.

If determining in ACT 21 that the reading unit 43 does not read the symbol (No in ACT 21), the control unit 300 determines whether the end button 422 is operated (that is, the settlement operation is performed) (ACT 51). If determining that the end button 422 is operated (Yes in ACT 51), the control unit 300 extinguishes the light emitting unit 44 (ACT 52). The control unit 300 executes the settlement processing based on the commodity information stored in the commodity information unit 331 (ACT 53). The control unit 300 ends the processing and returns to ACT 11.

In this way, the settlement device 1 in the embodiment includes the reading unit 43 that reads a symbol attached to a commodity, the packing unit 18 that is located near the reading unit 43 and packs the commodity, the symbol of which is read by the reading unit 43, the measuring unit 45 that measures the packed commodity, the light emitting unit 44 provided within a visual field of a packing operator in the packing unit 18, the determining means 301 for determining, using data of weight measured by the measuring unit 45, whether the commodity, the symbol of which is read by the reading unit 43, is packed, and the light-emission controlling means 302 for, if the determining means 301 determines that the commodity, the symbol of which is read by the reading unit 43, is packed, causing the light emitting unit 44 to emit light in a first form and, if the determining means 301 determines that the commodity, the symbol of which is read by the reading unit 43, is not packed, causing the light emitting unit 44 to emit light in a second form different from the first form.

In such a settlement device 1 in the embodiment, the light emitting unit 44 is provided within the visual field of the packing operator in the packing unit 18. If the determining means 301 determines that the commodity, the symbol of which is read by the reading unit 43, is packed, the light-emission controlling means 302 causes the light emitting unit 44 to emit light in the first form. If the determining means 301 determines that the commodity, the symbol of which is read by the reading unit 43, is not packed, the light-emission controlling means 302 causes the light emitting unit 44 to emit light in the second form different from the first form. Therefore, the operator can easily check the light emission of the light emitting unit 44.

The embodiment of the present invention is explained above. However, this embodiment is presented as an example and is not intended to limit the scope of the invention. This embodiment can be implemented in other various forms. Various omissions, substitutions, and changes can be made without departing from the spirit of the invention. This embodiment and modifications of the embodiment are included in the scope and the gist of the invention and included in the inventions described in claims and the scope of equivalents of the inventions.

Figure 6:
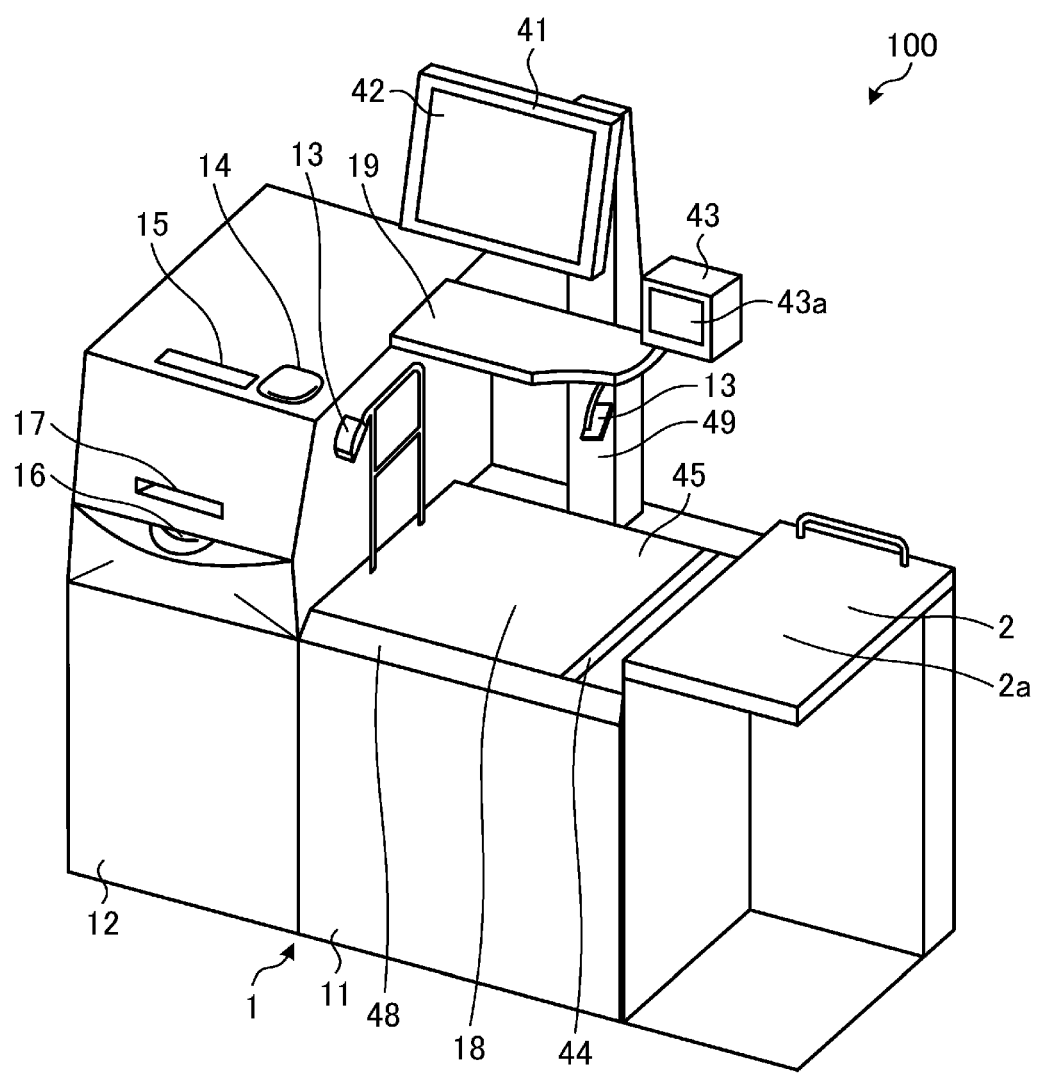
FIG. 6 is a front view illustrating the exterior of a checkout apparatus in a modification.

For example, in the embodiment, the light emitting unit 44 is provided at the corner section 48 of the packing unit 18. However, not only this, but the light emitting unit 44 only has to be provided in a position on the packing unit 18 where the light emitting unit 44 does not hinder a bag if the bag is hung on the packing tool 13 (a position where the light emitting unit 44 can be visually checked). For example, as illustrated in a modification in FIG. 6, the light emitting unit 44 may be located in a position on the packing unit 18 where the light emitting unit 44 is not hidden by a bag hung on the packing tool 13 (for example, a forward position of the reading unit 43). By providing the light emitting unit 44 in the forward position of the reading unit 43, it is possible to make it less easy for the operator to place the commodity, the symbol of which is read by the reading unit 43, in a forward position of the reading unit 43 (that is, on the light emitting unit 44) on the packing unit 18. If the commodity is placed in the forward position of the reading unit 43, it is likely that the symbol of the commodity is read again (read twice) by the reading unit 43. However, since it is less easy to place the commodity in the forward position of the reading unit 43 because the light emitting unit 44 is provided in the forward position of the reading unit 43, it is possible to prevent the commodity from being read twice.

In the embodiment, in the processing in ACT 22, the light-emission controlling means 302 causes the light emitting unit 44 to flash in blue. However, not only this, but, for example, in the processing in ACT 22, the light-emission controlling means 302 may light the light emitting unit 44 in blue.

In the embodiment, in the processing in ACT 42, the light-emission controlling means 302 causes the light emitting unit 44 to flash in red (emit light in the third form). However, not only this, but, for example, in the processing in ACT 42, the light-emission controlling means 302 may cause the light emitting unit 44 to flash in blue (emit light in the third form). This is because, if it is determined No in ACT 44, since it does not have to be determined yet that an error occurs in the settlement device 1, the light-emission controlling means 302 may cause the light emitting unit 44 to flash in blue rather than red indicating a warning.

What is claimed is:

1. A settlement device, comprising:
    a reading component configured to read a symbol attached to a commodity;
    a packing component located near the reading component and configured to pack the commodity, the symbol of which is read by the reading component;
    a measuring device configured to measure the packed commodity;
    a light emitting component provided in a recess formed at a customer facing intersection between a horizontal plane of the packing component and a vertical plane of the packing component, wherein the light emitting component is angled obliquely in the recess to be in a visual field of a user identity using the settlement device, and wherein the light emitting component is recessed into the recess to be level with at least the horizontal plane of the packing component and the vertical plane of the packing component;
    a determining component configured to determine, using data of weight measured by the measuring device, whether the commodity, the symbol of which is read by the reading component, is packed; and
    light-emission controller, if the determining component determines that the commodity, the symbol of which is read by the reading component, is packed, configured to cause the light emitting component to emit light in a first form and, if the determining component determines that the commodity, the symbol of which is read by the reading component, is not packed, configured to cause the light emitting component to emit light in a second form different from the first form.

2. The settlement device according to claim 1, wherein the light emitting component is provided in a corner section on a near side of the packing unit.

3. The settlement device according to claim 1, wherein the packing component is provided below the reading component, and the commodity, the symbol of which is read by the reading component, is packed within a visual field of an operator who operates the settlement device.

4. The settlement device according to claim 1, further comprising a weight storing component configured to store, for each commodity, weight of the commodity, wherein
    if the weight of the commodity measured by the measuring device and the weight of the commodity stored in the weight storing component coincide, the determining component determines that the commodity, the symbol of which is read by the reading component, is packed.

5. The settlement device according to claim 1, wherein, if the commodity is not measured by the measuring device even if a predetermined time elapses after the reading component reads the symbol, the light-emission controller causes the light emitting component to emit light in a third form different from both the first form and the second form.

6. The settlement device according to claim 1, wherein the reading component is configured to read a barcode or a two-dimensional code attached to the commodity.

7. The settlement device according to claim 1, wherein the light emitting component comprises a light emitting diode.

8. A checkout method, comprising:
reading a symbol attached to a commodity;
packing the commodity, the symbol of which is read by a reading component;
measuring the packed commodity;
determining, using data of weight measured, whether the commodity, the symbol of which is read by the reading component, is packed; and
if the commodity, the symbol of which is read by the reading component, is packed, causing a light emitting component to emit light in a first form and, if the commodity, the symbol of which is read by the reading component, is not packed, causing the light emitting component to emit light in a second form different from the first form, wherein the light emitting component is recessed into a customer facing recess located at an intersection of a horizontal plane of a packing component and a vertical plane of the packing component, wherein the light emitting component is affixed obliquely within the customer facing recess to be in a visual field of a user identity using the packing component, and wherein the light emitting component is located within the customer facing recess so as to be align with a first surface associated with the horizontal plane of the packing component and align with a second surface associated with the vertical plane of the packing component.

9. The checkout method according to claim 8, wherein the light emitting component is provided in a corner section.

10. The checkout method according to claim 8, further comprising:
packing the commodity within a visual field of an operator.

11. The checkout method according to claim 8, further comprising:
storing, for each commodity, weight of the commodity; and
if the weight of the commodity measured and the weight of the commodity stored coincide, determining that the commodity, the symbol of which is read by the reading component, is packed.

12. The checkout method according to claim 8, further comprising:
if the commodity is not measured even if a predetermined time elapses after the reading component reads the symbol, causing the light emitting component to emit light in a third form different from both the first form and the second form.

13. The checkout method according to claim 8, further comprising:
reading a barcode or a two-dimensional code attached to the commodity.

14. A self-checkout device, comprising:
a payment processing component;
a reading component configured to read a symbol attached to a commodity;
a packing component located near the reading component and configured to pack the commodity, the symbol of which is read by the reading component;
a measuring device configured to measure the packed commodity;
a light emitting component that is recessed into a customer facing recess located at an intersection of a horizontal plane of the packing component and a vertical plane of the packing component, wherein the light emitting component is obliquely oriented within the customer facing recess to be in a visual field of a user identity using the packing component, and wherein the light emitting component is situated within the customer facing recess so as to be flush along the horizontal plane of the packing component and the vertical plane of the packing component;
a determining component configured to determine, using data of weight measured by the measuring device, whether the commodity, the symbol of which is read by the reading component, is packed; and
light-emission controller, if the determining component determines that the commodity, the symbol of which is read by the reading component, is packed, configured to cause the light emitting component to emit light in a first form and, if the determining component determines that the commodity, the symbol of which is read by the reading component, is not packed, configured to cause the light emitting component to emit light in a second form different from the first form.

15. The self-checkout device according to claim 14, wherein the light emitting component is provided in a corner section on a near side of the packing unit.

16. The self-checkout device according to claim 14, wherein the packing component is provided below the reading component, and the commodity, the symbol of which is read by the reading component, is packed within a visual field of an operator who operates the settlement device.

17. The self-checkout device according to claim 14, further comprising a weight storing component configured to store, for each commodity, weight of the commodity, wherein
if the weight of the commodity measured by the measuring device and the weight of the commodity stored in the weight storing component coincide, the determining component determines that the commodity, the symbol of which is read by the reading component, is packed.

18. The self-checkout device according to claim 14, wherein, if the commodity is not measured by the measuring device even if a predetermined time elapses after the reading component reads the symbol, the light-emission controller causes the light emitting component to emit light in a third form different from both the first form and the second form.

19. The self-checkout device according to claim 14, wherein the reading component is configured to read a barcode or a two-dimensional code attached to the commodity.

20. The self-checkout device according to claim 14, wherein the light emitting component comprises a light emitting diode.

* * * * *